(12) United States Patent
Kumar et al.

(10) Patent No.: US 8,990,910 B2
(45) Date of Patent: Mar. 24, 2015

(54) SYSTEM AND METHOD USING GLOBALLY UNIQUE IDENTITIES

(75) Inventors: Srinivas Kumar, Cupertino, CA (US); Dean A. Weber, Novelty, OH (US); Virginia L. Roth, Oakland, CA (US); Shadab Munam Shah, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1289 days.

(21) Appl. No.: 12/270,278

(22) Filed: Nov. 13, 2008

(65) Prior Publication Data

US 2009/0133110 A1      May 21, 2009

Related U.S. Application Data

(60) Provisional application No. 60/987,466, filed on Nov. 13, 2007.

(51) Int. Cl.
*G06F 21/00* (2013.01)
*H04L 29/06* (2006.01)
*H04L 29/12* (2006.01)

(52) U.S. Cl.
CPC .......... *H04L 63/08* (2013.01); *H04L 29/12122* (2013.01); *H04L 29/12169* (2013.01); *H04L 61/1547* (2013.01); *H04L 61/1576* (2013.01); *H04L 63/102* (2013.01)
USPC .......................................................... 726/8

(58) Field of Classification Search
CPC ........ H04L 63/102; H04L 63/00; H04L 63/10
USPC ............................................................ 726/8
See application file for complete search history.

(56) References Cited

U.S. PATENT DOCUMENTS 5,218,637 A      6/1993  Angebaud et al.
(Continued)

FOREIGN PATENT DOCUMENTS

CA      2286534      4/2001
EP      1 071 256    1/2001
(Continued)

OTHER PUBLICATIONS

Aleksander Svelokken, "Biometric Authentication and Identification Using Keystroke Dynamics With Alert Levels", Master Thesis (Retrieved from University of Oslo), May 23, 2007, pp. 1-124.
Darryle Merlette, Dr. Parag Pruthi; Network Security; NetDetector: Identifying Real Threats and Securing Your Network; Copyright © 2003 Niksun, Inc., Monmouth Junction NJ, USA.
(Continued)

*Primary Examiner* — William Goodchild
(74) *Attorney, Agent, or Firm* — Foley & Lardner LLP; Christopher J. McKenna; Paul M. H. Pua (57) ABSTRACT

Systems and methods are described for creating a globally unique identity for a user or user-container by performing an iterative join where each participating back-end data source. The systems and methods include an ID-Unify (IDU) that performs identity virtualization and creates or generates a globally unique identifier for a user in operational environments in which there is a pre-existing conflict caused by the existence of different identities for a user in different authentication data sources.

23 Claims, 8 Drawing Sheets

(56) References Cited

U.S. PATENT DOCUMENTS

| | | |
|---|---|---|
| 5,757,916 A | 5/1998 | MacDoran et al. |
| 5,784,562 A | 7/1998 | Diener |
| 5,867,494 A | 2/1999 | Krishnaswamy et al. |
| 5,887,065 A | 3/1999 | Audebert |
| 5,983,270 A | 11/1999 | Abraham et al. |
| 5,987,611 A | 11/1999 | Freund |
| 5,999,525 A | 12/1999 | Krishnaswamy et al. |
| 6,021,495 A | 2/2000 | Jain et al. |
| 6,070,245 A | 5/2000 | Murphy et al. |
| 6,076,108 A | 6/2000 | Courts et al. |
| 6,105,136 A | 8/2000 | Cromer et al. |
| 6,141,758 A | 10/2000 | Benantar et al. |
| 6,145,083 A | 11/2000 | Shaffer et al. |
| 6,161,182 A | 12/2000 | Nadooshan |
| 6,170,019 B1 | 1/2001 | Dresel et al. |
| 6,199,113 B1 | 3/2001 | Alegre et al. |
| 6,219,669 B1 | 4/2001 | Haff et al. |
| 6,253,326 B1 | 6/2001 | Lincke et al. |
| 6,304,969 B1 | 10/2001 | Wasserman et al. |
| 6,335,927 B1 | 1/2002 | Elliott et al. |
| 6,345,291 B2 | 2/2002 | Murphy et al. |
| 6,393,569 B1 | 5/2002 | Orenshteyn |
| 6,418,472 B1 | 7/2002 | Mi et al. |
| 6,442,571 B1 | 8/2002 | Haff et al. |
| 6,452,915 B1 | 9/2002 | Jorgensen |
| 6,470,453 B1 | 10/2002 | Vilhuber |
| 6,473,794 B1 | 10/2002 | Guheen et al. |
| 6,480,967 B1 | 11/2002 | Jensen et al. |
| 6,502,192 B1 | 12/2002 | Nguyen |
| 6,510,350 B1 | 1/2003 | Steen et al. |
| 6,519,571 B1 | 2/2003 | Guheen et al. |
| 6,523,027 B1 | 2/2003 | Underwood |
| 6,535,917 B1 | 3/2003 | Zamanzadeh et al. |
| 6,536,037 B1 | 3/2003 | Guheen et al. |
| 6,594,589 B1 | 7/2003 | Coss et al. |
| 6,601,233 B1 | 7/2003 | Underwood |
| 6,609,128 B1 | 8/2003 | Underwood |
| 6,615,166 B1 | 9/2003 | Guheen et al. |
| 6,633,878 B1 | 10/2003 | Underwood |
| 6,640,248 B1 | 10/2003 | Jorgensen |
| 6,704,873 B1 | 3/2004 | Underwood |
| 6,718,535 B1 | 4/2004 | Underwood |
| 6,721,713 B1 | 4/2004 | Guheen et al. |
| 6,725,269 B1* | 4/2004 | Megiddo ............ 709/228 |
| 6,731,625 B1 | 5/2004 | Eastep et al. |
| 6,735,691 B1 | 5/2004 | Capps et al. |
| 6,748,287 B1 | 6/2004 | Hagen et al. |
| 6,754,181 B1 | 6/2004 | Elliott et al. |
| 6,766,314 B2 | 7/2004 | Burnett |
| 6,785,692 B2 | 8/2004 | Wolters et al. |
| 6,826,616 B2 | 11/2004 | Larson et al. |
| 6,839,759 B2 | 1/2005 | Larson et al. |
| 6,850,252 B1 | 2/2005 | Hoffberg |
| 6,856,330 B1 | 2/2005 | Chew et al. |
| 6,870,921 B1 | 3/2005 | Elsey et al. |
| 6,909,708 B1 | 6/2005 | Krishnaswamy et al. |
| 6,944,279 B2 | 9/2005 | Elsey et al. |
| 6,947,992 B1 | 9/2005 | Shachor |
| 6,954,736 B2 | 10/2005 | Menninger et al. |
| 6,957,186 B1 | 10/2005 | Guheen et al. |
| 6,985,922 B1 | 1/2006 | Bashen et al. |
| 7,013,290 B2 | 3/2006 | Ananian |
| 7,039,606 B2 | 5/2006 | Hoffman et al. |
| 7,054,837 B2 | 5/2006 | Hoffman et al. |
| 7,072,843 B2 | 7/2006 | Menninger et al. |
| 7,096,495 B1 | 8/2006 | Warrier et al. |
| 7,100,195 B1 | 8/2006 | Underwood |
| 7,107,285 B2 | 9/2006 | Von Kaenel et al. |
| 7,120,596 B2 | 10/2006 | Hoffman et al. |
| 7,145,898 B1 | 12/2006 | Elliott |
| 7,149,698 B2 | 12/2006 | Guheen et al. |
| 7,149,803 B2 | 12/2006 | Douglis et al. |
| 7,160,599 B2 | 1/2007 | Hartman |
| 7,165,041 B1 | 1/2007 | Guheen et al. |
| 7,171,379 B2 | 1/2007 | Menninger et al. |
| 7,188,138 B1 | 3/2007 | Schneider |
| 7,188,180 B2 | 3/2007 | Larson et al. |
| 7,194,552 B1 | 3/2007 | Schneider |
| 7,331,061 B1 | 2/2008 | Ramsey et al. |
| 7,334,125 B1 | 2/2008 | Pellacuru et al. |
| 7,353,533 B2 | 4/2008 | Wright et al. |
| 7,363,347 B2 | 4/2008 | Thomas |
| 7,386,889 B2 | 6/2008 | Shay |
| 7,398,552 B2 | 7/2008 | Pardee et al. |
| 7,430,760 B2 | 9/2008 | Townsend et al. |
| 7,509,687 B2 | 3/2009 | Ofek et al. |
| 7,519,986 B2 | 4/2009 | Singhal |
| 7,567,510 B2 | 7/2009 | Gai et al. |
| 7,596,803 B1 | 9/2009 | Barto et al. |
| 7,637,147 B2 | 12/2009 | Lee et al. |
| 7,644,434 B2 | 1/2010 | Pollutro et al. |
| 7,660,902 B2 | 2/2010 | Graham et al. |
| 7,660,980 B2 | 2/2010 | Shay et al. |
| 7,770,223 B2 | 8/2010 | Shevenell et al. |
| 8,412,838 B1 | 4/2013 | Wang et al. |
| 2001/0020195 A1 | 9/2001 | Patel et al. |
| 2001/0052012 A1 | 12/2001 | Rinne et al. |
| 2001/0054044 A1 | 12/2001 | Liu et al. |
| 2001/0054147 A1 | 12/2001 | Richards |
| 2002/0002577 A1 | 1/2002 | Garg et al. |
| 2002/0022969 A1 | 2/2002 | Berg et al. |
| 2002/0029086 A1 | 3/2002 | Ogushi et al. |
| 2002/0062367 A1* | 5/2002 | Debber et al. ............ 709/224 |
| 2002/0077981 A1 | 6/2002 | Takatori et al. |
| 2002/0078015 A1* | 6/2002 | Ponnekanti ............ 707/1 |
| 2002/0080822 A1 | 6/2002 | Brown et al. |
| 2002/0083183 A1 | 6/2002 | Pujare et al. |
| 2002/0116643 A1 | 8/2002 | Raanan et al. |
| 2002/0133723 A1 | 9/2002 | Tait |
| 2002/0146026 A1 | 10/2002 | Unitt et al. |
| 2002/0146129 A1 | 10/2002 | Kaplan |
| 2002/0184224 A1 | 12/2002 | Haff et al. |
| 2002/0193966 A1 | 12/2002 | Buote et al. |
| 2003/0005118 A1 | 1/2003 | Williams |
| 2003/0005300 A1 | 1/2003 | Noble et al. |
| 2003/0009538 A1 | 1/2003 | Shah et al. |
| 2003/0023726 A1 | 1/2003 | Rice et al. |
| 2003/0033545 A1 | 2/2003 | Wenisch et al. |
| 2003/0055962 A1 | 3/2003 | Freund et al. |
| 2003/0063750 A1 | 4/2003 | Medvinsky et al. |
| 2003/0083991 A1 | 5/2003 | Kikinis |
| 2003/0084350 A1 | 5/2003 | Eibach et al. |
| 2003/0171885 A1 | 9/2003 | Coss et al. |
| 2003/0179900 A1 | 9/2003 | Tian et al. |
| 2003/0200439 A1 | 10/2003 | Moskowitz |
| 2003/0204421 A1* | 10/2003 | Houle et al. ............ 705/4 |
| 2003/0208448 A1 | 11/2003 | Perry et al. |
| 2003/0208562 A1 | 11/2003 | Hauck et al. |
| 2003/0217126 A1 | 11/2003 | Polcha et al. |
| 2003/0217166 A1 | 11/2003 | Dal Canto et al. |
| 2003/0220768 A1 | 11/2003 | Perry et al. |
| 2003/0220821 A1* | 11/2003 | Walter et al. ............ 705/3 |
| 2004/0006710 A1 | 1/2004 | Pollutro et al. |
| 2004/0022191 A1 | 2/2004 | Bernet et al. |
| 2004/0024764 A1 | 2/2004 | Hsu et al. |
| 2004/0031058 A1 | 2/2004 | Reisman |
| 2004/0049515 A1 | 3/2004 | Haff et al. |
| 2004/0107342 A1 | 6/2004 | Pham et al. |
| 2004/0107360 A1 | 6/2004 | Herrmann et al. |
| 2004/0111410 A1* | 6/2004 | Burgoon et al. ............ 707/4 |
| 2004/0142686 A1 | 7/2004 | Kirkup et al. |
| 2004/0193606 A1 | 9/2004 | Arai et al. |
| 2004/0193912 A1 | 9/2004 | Li et al. |
| 2004/0214576 A1 | 10/2004 | Myers et al. |
| 2004/0228362 A1 | 11/2004 | Maki et al. |
| 2004/0230797 A1 | 11/2004 | Ofek et al. |
| 2005/0015624 A1 | 1/2005 | Ginter et al. |
| 2005/0027788 A1 | 2/2005 | Koopmans et al. |
| 2005/0038779 A1* | 2/2005 | Fernandez et al. ............ 707/3 |
| 2005/0132030 A1 | 6/2005 | Hopen et al. |
| 2005/0185647 A1 | 8/2005 | Rao et al. |
| 2005/0265351 A1 | 12/2005 | Smith et al. |
| 2005/0283822 A1 | 12/2005 | Appleby et al. |
| 2006/0005240 A1 | 1/2006 | Sundarrajan et al. |

(56) References Cited

U.S. PATENT DOCUMENTS

| | | | |
|---|---|---|---|
| 2006/0068755 A1 | 3/2006 | Shraim et al. | |
| 2006/0075464 A1 | 4/2006 | Golan et al. | |
| 2006/0080441 A1 | 4/2006 | Chen et al. | |
| 2006/0080667 A1 | 4/2006 | Sanghvi et al. | |
| 2006/0090196 A1 | 4/2006 | Van Bemmel et al. | |
| 2006/0198394 A1 | 9/2006 | Gotoh et al. | |
| 2006/0218273 A1 | 9/2006 | Melvin | |
| 2006/0245414 A1 | 11/2006 | Susai et al. | |
| 2006/0248480 A1 | 11/2006 | Faraday et al. | |
| 2006/0248580 A1 | 11/2006 | Fulp et al. | |
| 2006/0271652 A1 | 11/2006 | Stavrakos et al. | |
| 2006/0274774 A1 | 12/2006 | Srinivasan et al. | |
| 2006/0277275 A1 | 12/2006 | Glaenzer | |
| 2006/0277591 A1 | 12/2006 | Arnold et al. | |
| 2006/0282545 A1 | 12/2006 | Arwe et al. | |
| 2006/0282876 A1 | 12/2006 | Shelest et al. | |
| 2007/0038618 A1* | 2/2007 | Kosciusko et al. | 707/4 |
| 2007/0061434 A1 | 3/2007 | Schmieder et al. | |
| 2007/0113269 A1 | 5/2007 | Zhang | |
| 2007/0136317 A1* | 6/2007 | Przywara | 707/100 |
| 2007/0192853 A1 | 8/2007 | Shraim et al. | |
| 2007/0271592 A1 | 11/2007 | Noda et al. | |
| 2007/0283014 A1 | 12/2007 | Shinomiya et al. | |
| 2007/0294762 A1 | 12/2007 | Shraim et al. | |
| 2007/0299915 A1 | 12/2007 | Shraim et al. | |
| 2008/0005779 A1 | 1/2008 | Takenaka et al. | |
| 2008/0008202 A1 | 1/2008 | Terrell et al. | |
| 2008/0215889 A1 | 9/2008 | Celik et al. | |
| 2009/0158384 A1 | 6/2009 | Kanade et al. | |
| 2009/0210364 A1 | 8/2009 | Adi et al. | |
| 2010/0037284 A1 | 2/2010 | Sachs | |
| 2010/0223222 A1 | 9/2010 | Zhou et al. | |
| 2010/0235879 A1 | 9/2010 | Burnside et al. | |
| 2011/0280215 A1 | 11/2011 | Nakagawa et al. | |
| 2012/0051529 A1 | 3/2012 | Dobbins et al. | |
| 2012/0096513 A1 | 4/2012 | Raleigh et al. | |
| 2012/0304277 A1 | 11/2012 | Li et al. | |

FOREIGN PATENT DOCUMENTS

| | | |
|---|---|---|
| EP | 1 418 730 | 5/2004 |
| EP | 1 641 215 | 3/2006 |
| JP | 06-097905 | 4/1994 |
| JP | 11-205388 | 7/1999 |
| JP | 2001-306521 | 11/2001 |
| JP | 2003-008651 | 1/2003 |
| WO | WO-01/33759 | 5/2001 |
| WO | WO-01/38995 | 5/2001 |
| WO | WO-02/079949 | 10/2002 |
| WO | WO-2005/066737 A1 | 7/2005 |

OTHER PUBLICATIONS

Darryle Merlette; Spencer Parker, Dr. Parag Pruthi; Niksun Network Security; NetDetector: Monitoring and Minimizing Instant Messaging Risks; Copyright © 2003 Niksun, Inc., Monmouth Junction NJ, USA.
International Search Report for International Application No. PCT/US2008/007984; Completed Aug. 22, 2009; Mailed Sep. 3, 2009.
International Search Report for PCT Application No. PCT/US2004/043405; Completed Mar. 15, 2005; Mailed Mar. 23, 2005.
Japanese Office Action on 2006-547397 dated Jul. 5, 2011.
Japanese Office Action on 2006-547397 dated Nov. 30, 2010.
Notice of Allowance for U.S. Appl. No. 10/423,444 dated Nov. 16, 2009.
Office Action for U.S. Appl. No. 12/163,292 dated Aug. 8, 2011.
Office Action for U.S. App. No. 12/163,292 dated Feb. 2, 2011.
Office Action for U.S. Appl. No. 10/423,444 dated Dec. 2, 2008.
Office Action for U.S. Appl. No. 10/423,444 dated Feb. 25, 2009.
Office Action for U.S. Appl. No. 10/423,444 dated Jul. 27, 2009.
Office Action for U.S. Appl. No. 10/423,444 dated Jun. 13, 2006.
Office Action for U.S. Appl. No. 10/423,444 dated Mar. 12, 2007.
Office Action for U.S. Appl. No. 10/423,444 dated Mar. 14, 2008.
Office Action for U.S. Appl. No. 10/423,444 dated Sep. 19, 2008.
Office Action for U.S. Appl. No. 10/423,444 dated Sep. 7, 2007.
Office Action for U.S. Appl. No. 10/583,578 dated Feb. 11, 2011.
Office Action for U.S. Appl. No. 10/583,578 dated Jul. 19, 2011.
Office Action for U.S. Appl. No. 10/583,578 dated Jun. 24, 2010.
Office Action for U.S. Appl. No. 12/406,613 dated Oct. 24, 2011.
Office Action on U.S. Appl. No. 12/267,804 dated Aug. 16, 2011.
Office Action on U.S. Appl. No. 12/267,804 dated Apr. 25, 2011.
Scarfone et ai, Guide to Intrusion Detection and Prevention Systems (IOPS), Feb. 2007, NIST, Special Publication 800-94.
Written Opinion of the International Search Authority for PCT Application No. PCT/US2004/043405; Completed Mar. 15, 2005; Mailed Mar. 23, 2005.
Notice of Allowance for U.S. Appl. No. 10/583,578 dated Mar. 27, 2012.
Office Action for U.S. Appl. No. 12/267,804 dated Apr. 10, 2012.
Office Action for U.S. Appl. No. 12/267,850 dated Nov. 7, 2012.
Office Action for U.S. Appl. No. 12/267,850 dated Jun. 14, 2012.
Office Action for U.S. Appl. No. 12/406,613 dated Mar. 20, 2012.
Office Action for U.S. Appl. No. 12/432,186 dated Jun. 25, 2012.
Notice of Allowance for U.S. Appl. No. 12/267,804 dated Apr. 24, 2013.
Office Action for U.S. Appl. No. 12/267,804 dated Sep. 27, 2012.
Office Action for U.S. Appl. No. 12/267,850 dated Mar. 26, 2013.
Office Action for U.S. Appl. No. 12/267,850 dated Sep. 30, 2013.
Office Action for U.S. Appl. No. 12/432,186 dated Feb. 21, 2013.
Office Action for U.S. Appl. No. 12/163,292 dated Apr. 25, 2014.

* cited by examiner

Aggregate Join

N-ary Join

SYSTEM AND METHOD USING GLOBALLY UNIQUE IDENTITIES

CROSS REFERENCE TO RELATED APPLICATION

This application claims the benefit of United States Patent Application No. 60/987,466, filed Nov. 13, 2007, the content of which is incorporated herein by reference.

TECHNICAL FIELD

The present invention relates to the field of communication systems and, more particularly, to unique identities and systems and methods for establishing globally unique identities for improved security in packet communication systems.

BACKGROUND

User identifiers are used in disparate systems for authentication of users. These user identifiers take the form of passwords, electronic mail (email) user identifiers, and biometrics, among others. Each system may have its own method for the identification of a particular user.

BRIEF DESCRIPTION OF THE DRAWINGS

The invention is best understood from the following detailed description when read in connection with the accompanying drawings. Moreover in the drawings, common numerical references are used to represent like features/elements. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

In conventional distributed networked application environments, user attributes such as last name, telephone extension, department, project role, security clearance, and location, among others, may be temporal in nature. This causes top-down provisioning of changes which may be tedious, workflow driven administrative procedures in enterprises. Moreover, static access control lists without an identity component are not an extensible framework in current mobile networking environments where source IP address are translated by Network Address Translation (NAT) and Virtual Private Network (VPN) gateways to obscure a true endpoint address of a remote user at a point of network access. Identity-based access control may include tighter integration with identity data silos and virtualization for administrative simplicity and manageability. Conventional systems include user directories, such as RADIUS and Active Directory, to authenticate users in a single incarnation. Applications may use directory enabled networking to enforce policies at an application layer. In conventional systems, conflict resolution and ambiguity in automated entities merged across disparate identity silos use manual intervention and moderation. For example, two different people may exist in the same or different organization unit by the same first and last name. This represents a unique challenge for policy enforcement at the network layer based on non-repudiated identity.

Methods and systems are described below for creating a globally unique identity for a user or user-container by performing, for example, an iterative join in which each participating back-end pre-existing data source may serve as a primary node in a mathematical join operation. The systems and methods may include hardware or software or a combination thereof, referred to herein as the ID-Unify (IDU), that may perform identity virtualization. The IDU may create or generate a globally unique identifier for a user. The globally unique identifier may be used in operational environments having pre-existing conflicts caused by the existence of different identities for the user in different authentication data sources.

Directory Enabled Networking (DEN) and virtual directories operate at an application layer. By contrast, the Identity Driven Networking (IDN) process used by the IDU may operate at a network layer. The IDU and IM (described in detail below) may provide a dynamic and monolithic solution to aggregate policy as an integral part of a globally unique identity captured in and distributed from a single authoritative repository for establishing identity-based access control.

Conventionally, virtual directories typically support transitive and non-transitive joins where a primary node in the join is a superset node. Under such a conventional scheme, however, users not present in the primary node are excluded by the join. An aggregate join, where a superset node is not used, may be applicable where no overlap exists, (i.e., a user exists in one and only one node in the join). In cases where conventional joins and aggregation methods are inadequate, because there is no superset identity data source and there is identity overlap across the disparate data sources in the join, an N-ary join may enable consolidation of identities, and an IM conflict resolution may provide reconciliation and normalization of redundant identities, and may distinguish and resolve ambiguous identities. The identity virtualization of various exemplary embodiments may facilitate creation of a superset of global identities from scattered and disparate sources of identity.

Figure 1:
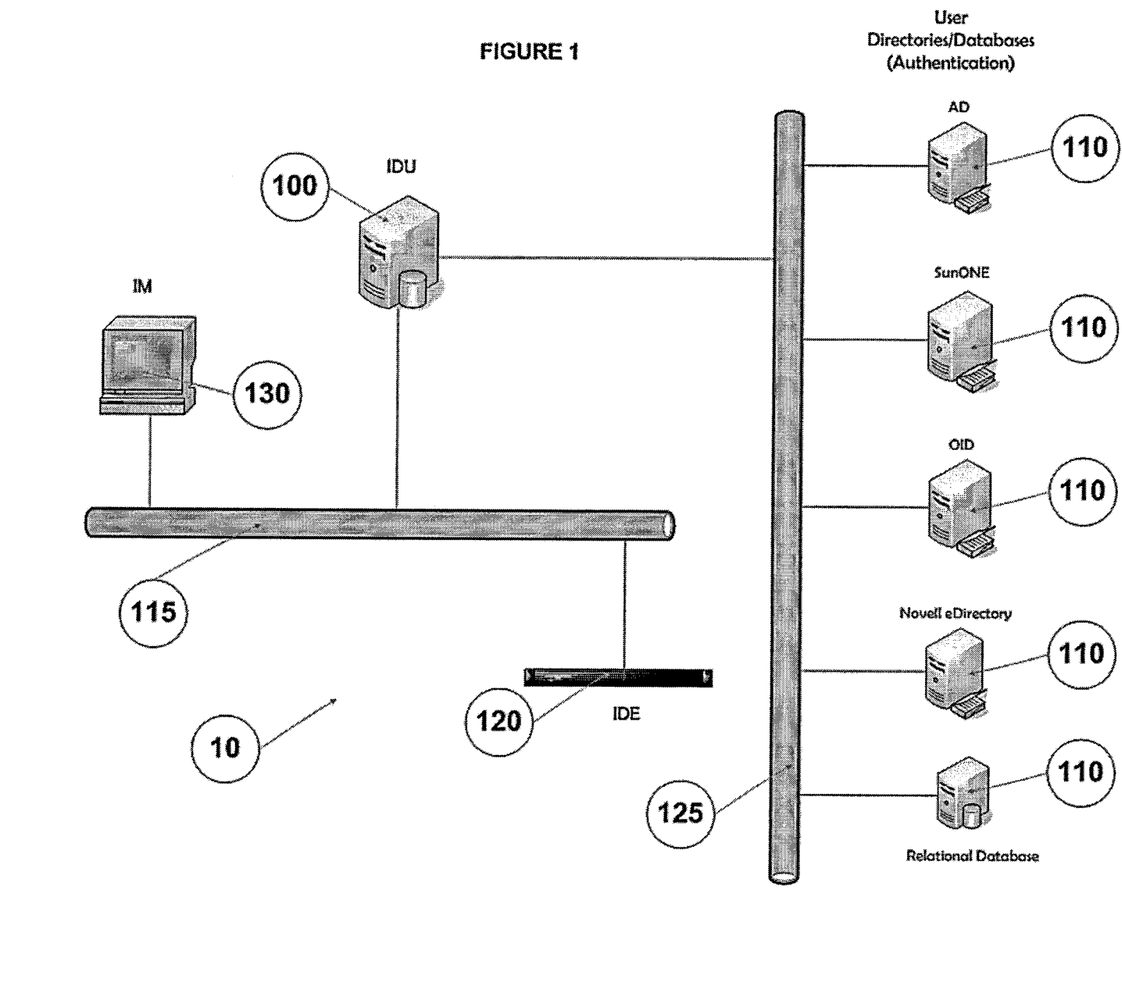
FIG. 1 is a schematic diagram illustrating a communication system including an ID Unify (IDU) in accordance with an exemplary embodiment of the present invention.

FIG. 1 is a schematic diagram of a communication system 10 including an IDU 100 that may enable globally unique identity generation, maintenance, and identity checking in accordance with an embodiment of the present invention.

Figure 2:
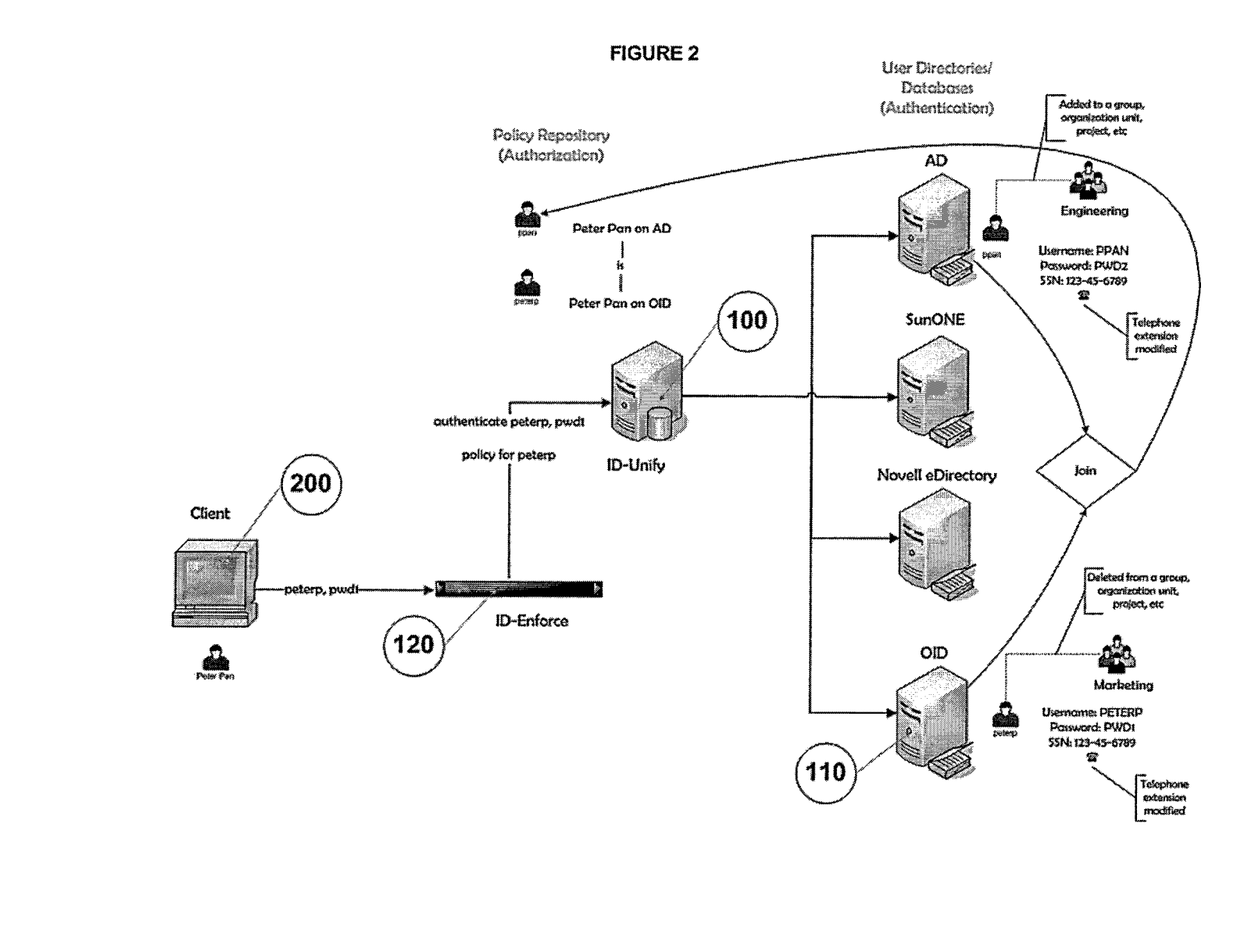
FIG. 2 is a schematic diagram of the communication system including the IDU illustrating information flow for maintaining a globally unique identity for users in accordance with another exemplary embodiment of the present invention.

FIG. 2 is a schematic diagram of the communication system 10 of FIG. 1 illustrating information flow for maintaining a globally unique identity for users, in accordance with another embodiment of the present invention.

Figure 3:
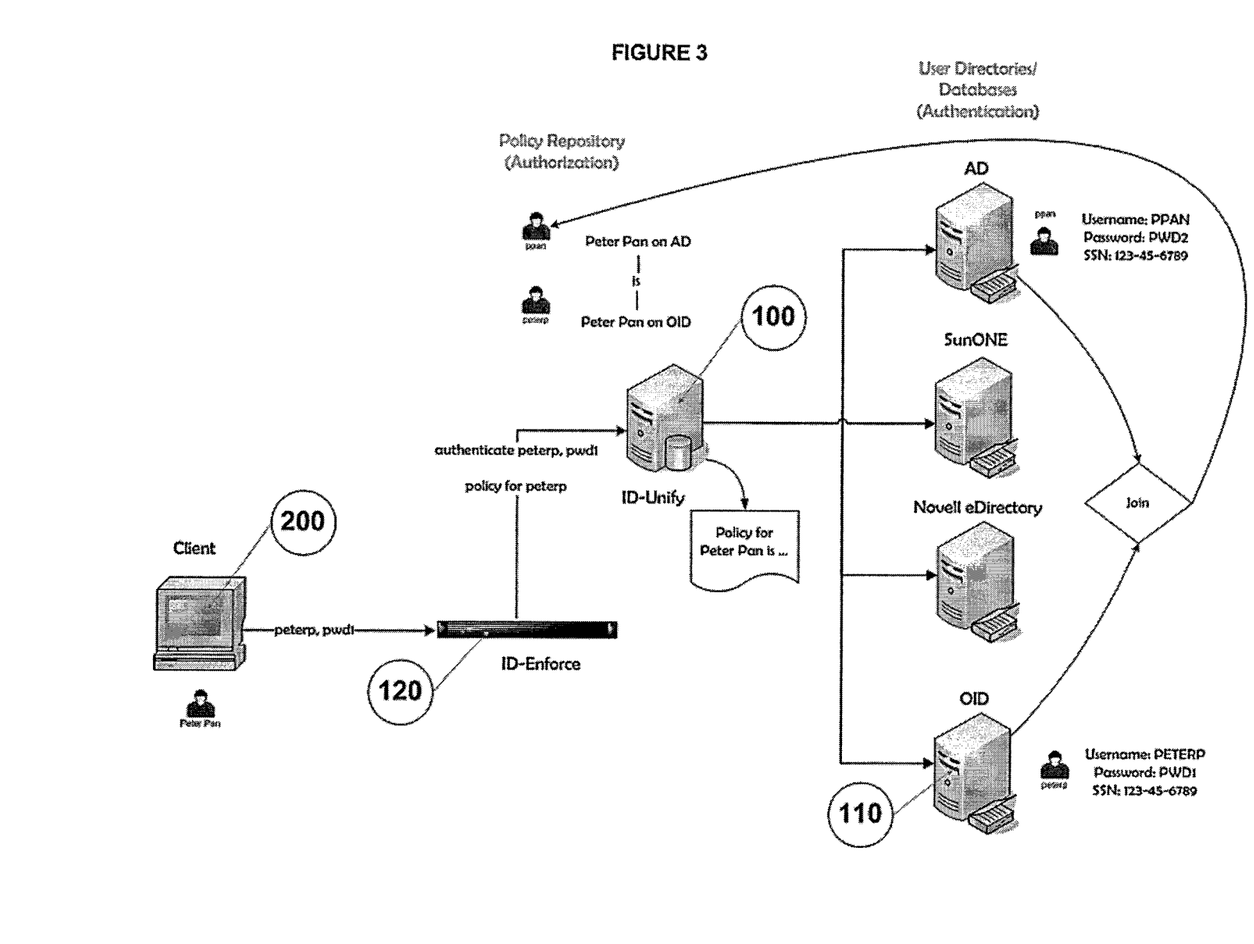
FIG. 3 is a schematic diagram of the communication system including the IDU illustrating information flow for using the unique identity for access control in accordance with yet another exemplary embodiment of the present invention.

FIG. 3 is a schematic diagram of the communication system 10 of Figure illustrating information flow for using the unique identity for access control, in accordance with yet another embodiment of the present invention.

Referring to FIGS. 1-3, the system 10 includes an IDU device (hardware) and/or application (software) 100 coupled to any number of databases and/or user directories (DS) 110 (either directly or indirectly via one or more networks or communication lines 125). The IDU 100 may generate a globally unique identity for a user or user-container by performing a join operation of user identity information for the user or the user-container from among any number of the DSs 110. The DSs 110 may be any number, type, and/or combination of data sources, for example, typically found in an enterprise computing environment.

The communication system 10 may also include an ID-Enforce (IDE) 120 coupled either directly or indirectly (e.g., via network 115) to the IDU 100. The IDE 120 may include a gateway appliance or device that receives electronic requests from a requestor (e.g., via an application from a client 200). Application policies may be provisioned top-down and may be enforced at layer 7 (e.g., a network layer) of, for example, an OSI protocol stack. Identity authentication may be performed when a user attempts to access the application. In certain exemplary embodiments, enforcement of an application policy occurs at the network layer prior to the user obtaining access to the application at the application layer, for example of the OSI protocol stack. The IDE 120 may provide a policy enforcement point that integrates global user identity with enterprise application access at the network layer. The IDE 120 may provide access controls for both pre-application and post-application access based on: (1) user identity; (2) memberships in user containers; and (3) changing identifiers including, for example, information from mandatory and optional directory attributes in LDAP directories, relation databases, role based access control solutions and solutions that may provision and/or integrate with pre-provisioned user's application specific entitlements.

The communication system 10 also may include an Identisphere Manager (IM) 130 coupled (either directly or indirectly via network 115) to IDU 100 and the IDE 120. The IM 130 may include hardware and software such as, for example, a computer executing graphical user interface software or other applications. The IM 130 and the IDU 100 may use standards such as LDAP and SQL protocol specifications to integrate with directories and relational databases 110, respectively.

The IDU 100 may create a globally unique identity for a user or a user-container by performing an iterative join in which each participating DS 110 may serve as a primary node in a mathematical join operation. That is, the IDU 100 may perform identity virtualization that creates or generates the globally unique identifier for the user in operational environments where pre-existing conflict may be caused by the existence of different identities for a user in different authentication DSs 110. The identity virtualization performed by the IDU 100 may be a virtual data source that does not duplicate or mirror identities in the mapped backend DSs 110, however, other non-virtual data source configurations are possible. The IDU 100 may use virtual directories to consolidate disparate forms of identification from pre-existing identity islands such as LDAP directories and databases for authentication and authorization based on attributes and assigned user roles and privileges.

The IDU 100 may include a unified directory server and a virtual directory (not shown). The virtual directory or virtual directory server may provide a consolidated view of user identity without having to construct an entire directory infrastructure. Implemented in the form of middleware in a distributed environment, the virtual directory may be a lightweight service that may operate between applications and identity data or data entities of the DSs 110.

A virtual directory may receive one or more queries for user information and may direct them to the appropriate DSs 110. Once the user data is retrieved, the directory may apply transformations based on configured rulesets stored, for example in the IDU 100, and may present the user data to the enterprise application as though the data resides at a centrally managed location. The protocol used for the IDU may include LDAP, however, other protocols are possible. The virtual directory of the IDU 100 may serve to provide application specific views of identity data which may avoid developing a master enterprise schema.

Referring to FIG. 2, the IDE 120 authenticating the identity of a user at client 200 may request user information stored in the DSs 110 (e.g., "User Directories/Databases" represented as "AD", "SunONE", "Novell eDirectory", and "OID") and relating to users is received at the IDE 120. The request received from the requestor may include, for example, a name and a domain of a user. In response to the request for user information, the IDU 100 may determine if the user (and related user information) exists in any of the DSs 110. When the user exists in the domain, the IDU 230 may retrieve or may fetch any user objects or identifiers corresponding to (relating to) the user from any data source in which the user objects reside. The IDU 230 then may manipulate the user objects to find an intersection between the various objects. The IDU 100 may use one of: (1) an aggregate join operation; or (2) an N-ary join operation to find such an intersection between multiple user objects corresponding to the user identified in the received request. The aggregate join and the N-ary join may each be of a type including transitive joins or non-transitive joins As an example, a request for user information corresponding to the user "Peter Pan" stored in DSs 110 may be received at the IDE 120. The request received from a requestor may include, for example, a name and a domain of the user. In response to the request, the IDE 120 may communicate with the IDU 100 such that the IDU 100 may determine if the user exists in any of the DSs 110. In this example, Peter Pan exists in the domain, so the IDU 100 may retrieve or may fetch user objects or identifiers corresponding to the user "Peter Pan" from data sources AD and OID. The IDU 100 then may manipulate the user objects to find the intersection between the objects stored in the data sources 110. The IDU 100 may use a join operation to find the intersection between the multiple user objects corresponding to the user "Peter Pan".

Now referring to FIGS. 2 and 3, the IDU 100 may determine whether to perform a conflict resolution operation. If it is determined that no conflict exists between identifiers stored in DSs AD and OID 110 corresponding to or associated with the user "Peter Pan", then no conflict operation is used. That is, when the identifiers associated with "Peter Pan" match, for example when the SSN of 123-45-6789 associated with "Peter Pan" stored on AD and OIL are the same, no conflict resolution operation is used. Thus, the IDU may generate a policy for the user "Peter Pan" indicating that the identifiers in data sources AD and OID 210 corresponding to the user "Peter Pan" each correspond to the same user.

Each data entity in the DSs 110 is represented by a distinguished name (DN) that includes a set of attributes corresponding to the data entity. In the case of a conflict between data entities, the IDU 100 may perform a conflict resolution operation between the conflicting entities by generating a composite Relative Distinguished Name (RDN). The composite RDN may combine or composite two or more attributes (e.g., user attributes) to form a single composite attribute corresponding, for example, to the user. For example, a composite RDN may be formed using a DN (e.g., common name, i.e., first name and last name) and one or more unique directory attributes to resolve conflicts/overlap of identities resulting from a join operation on multiple backend DSs 110. The directory attributes to be used in generating a composite RDN may be determined using a set of transformation rules or mappings. The attributes may include, for example, email identification, employee identification, department identification, social security number, and telephone extension number among others that are associated with a user or user container. Such attributes may also include any type of information in an enterprise that is unique to and/or used to differentiate each user represented in the enterprise directories or databases. As one example, the composite RDN may be formed using the user's common name and email address. Data consolidation through virtualization may lead to conflicts that applications (e.g., the consumers of identity) of virtual directories may not be able to resolve for the specific use-cases that existed prior to the introduction of virtualization between the application and the data sources. The IM 130 (shown in FIG. 1) may include a client application that interfaces with virtual directories to assign access controls (or policies) at the network layer based on user identity acquired through identity virtualization.

In various exemplary embodiments, access to a resource on a network may be secured using a global identifier. For example, the IDU may: obtain a plurality of identifiers associated with a user of the network, each of the plurality of identifiers may individually identify the user and may generate a superset of the plurality of identifiers, as the global identifier. One or more policies may be established to be associated with the global identifier of the user such that access to the resource on the network by the user may be restricted based on the one or more policies associated with the global identifier. Further, the user may also be allowed access to the resource when the user is authenticated and the one or more policies permit access by the user to the resource. Moreover, the one or more policies are identified as applying to the request for access by the user by generating the superset of the plurality of identifiers each time from the stored plurality of identifiers for each request.

In certain exemplary embodiments, the IDU may obtain the plurality of identifiers by, for example, determining a plurality of identifier storage locations (DS locations/logical addresses), each identifier storage location storing one or more of the plurality of identifiers and querying each of the identifier storage locations to obtain the plurality of identifiers.

In certain exemplary embodiments, the IDU may generate the superset of the plurality of identifiers by, for example, determining whether information associated with the user from the different storage locations conflict and if the user information from the different identified storage locations do not conflict, generating an aggregate join of the plurality of identifiers.

In certain exemplary embodiments, the IM may select one or more attributes of the global identifier for identifying the user when a conflict exists between information associated with the user from different identifier storage locations and the IDU may determine the particular policies to be used for access control by matching the user information from the user or client system of the user regarding the one or more attributes to the one or more selected attributes in the global identifier.

Figure 4A:
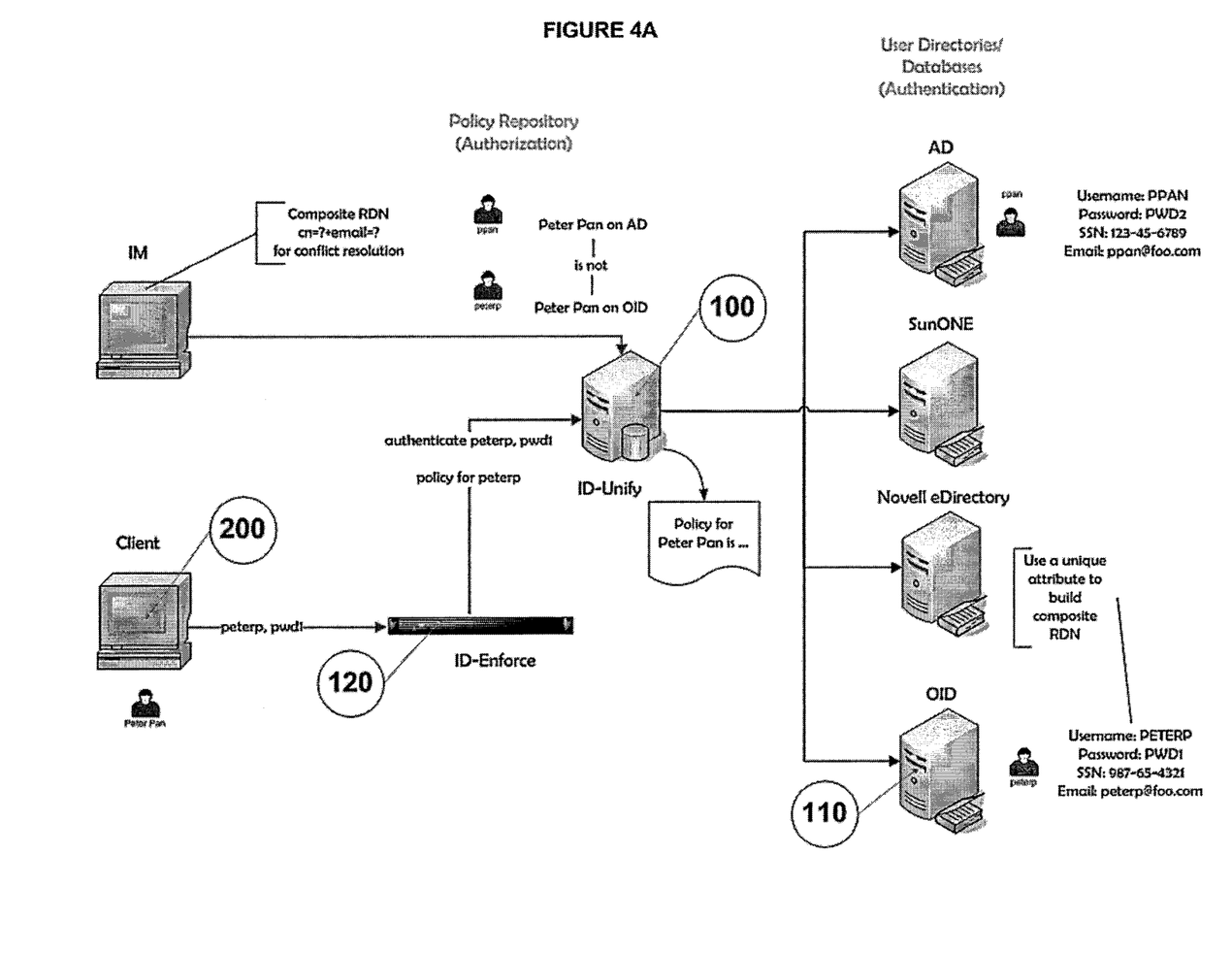
FIG. 4A is a block diagram of the communication system including the IDU and an Identisphere Manager (IM) illustrating information flow for distinguishing users or user-containers in accordance with yet another exemplary embodiment of the present invention.
Figure 4B:
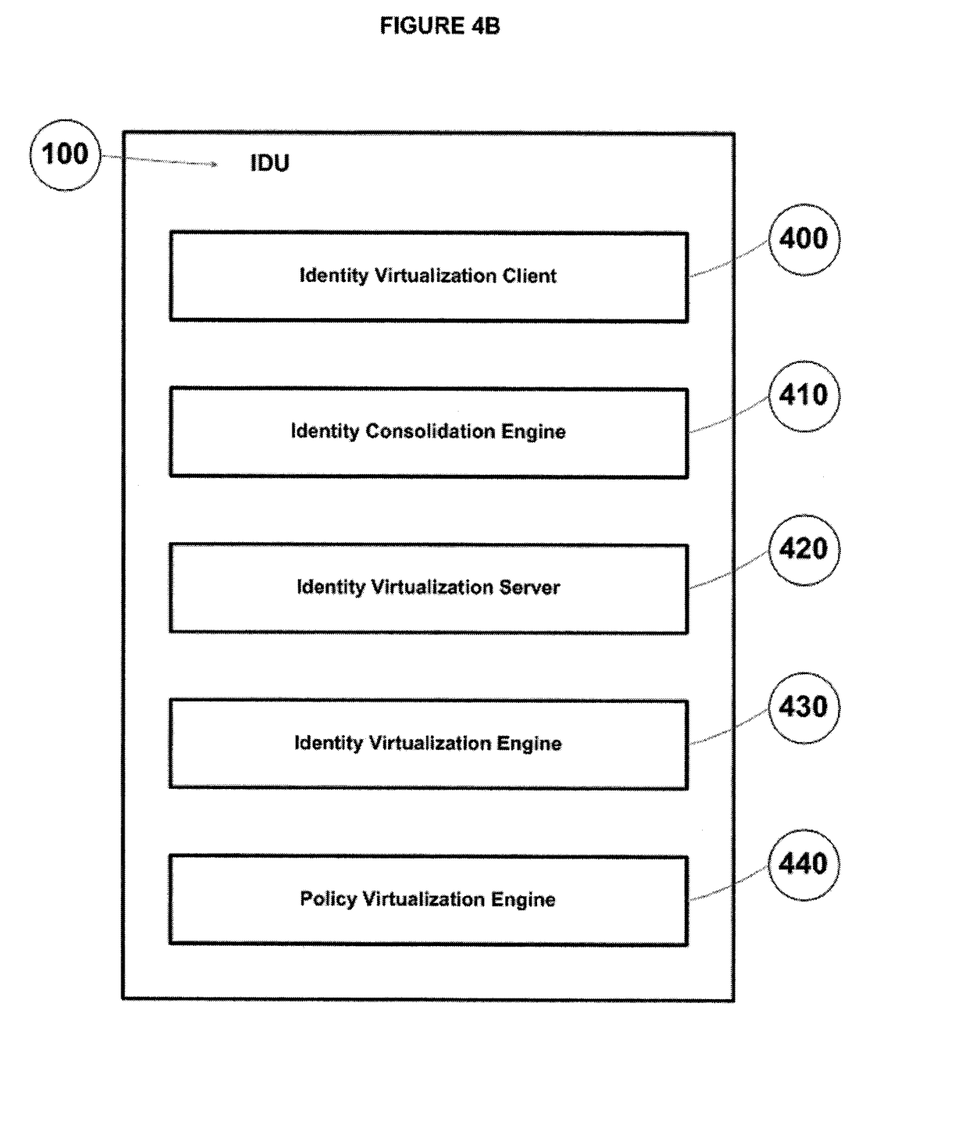
FIG. 4B is a block diagram of the IDU of FIG. 1 in accordance with yet another exemplary embodiment of the present invention.

FIG. 4B is a block diagram of the IDU of FIG. 1 in accordance with yet another exemplary embodiment of the present invention.

Referring to FIG. 4B, IDU 100 may be configured to communication with IDE 120 and DSs 110 to generate a unique global identifier, and may include: (1) Identity Virtualization Client 400 (e.g., a query unit or module) for querying the plurality of identifiers associated with the user; (2) Identity Consolidation Engine 410 for generating the superset of the plurality of identifiers, based on transformation and mapping rules for objects, object containers and attributes retrieved from multiple disparate DSs 110, as the unique global identifier and for identifying one or more access policies associated with the unique global identifier; (3) Identity Virtualization Server 420 (e.g., a communication unit or module) for outputting the global identifier to global identify user devices; (4) Identity Virtualization Engine 430 (e.g., a reception module or unit) for receiving an access request to access one or more secured resources on the network; (5) Policy Virtualization Engine 440 (e.g., an access module or unit) for permitting access to the one or more secured resources when the user is allowed to access the one or more secured resources based on the identified access policies. Further, the Policy Virtualization Engine 440 may restrict access to the one or more resources when the user is not permitted access to the one or more resources based on the identified access policies.

FIG. 4A is a schematic diagram of the communication system 10 including the IDU 100 and IM 130 illustrating information flow for distinguishing users or user-containers where there is an existing conflict and/or ambiguity with user identity information associated with the same user (e.g., "Peter Pan") in accordance with yet another exemplary embodiment of the present invention.

The IM 130 may reconcile redundant forms of identification that are associated with a single unique instance of a user to a single globally unique identity descriptor. The single globally unique identity descriptor may be associated with access control rules and policies used by policy definitions and enforcement points. The IM 130 also may distinguish users in cases where there is an existing conflict and/or ambiguity in distinguishing users having identical names in DSs 110, through a unique attribute or a series of prioritized unique attributes associated with the user, such as an email-address, a department, an office location, and/or a telephone extension, among many others. Furthermore, the IM 130 may provide a method to distinguish users in cases where there is an existing conflict and/or ambiguity in distinguishing user-containers (such as user-groups) with identical names, through a unique attribute or prioritized unique attributes associated with the user container.

Referring to FIG. 4A, IDE 120 may receive a request for user information corresponding to the user "Peter Pan" stored in the DSs 110. The received request may include, for example, the name and the domain of the user. In response to the request for user information, the IDU 100 may determine if the user (and associated user identity information) exists in any of the DSs 110. In this case, the user "Peter Pan" exists in the domain, so the IDU 100 may retrieve or may fetch user objects or identifiers corresponding to the user The IDU 100 then may manipulate the user objects to find the intersection between the various objects. Because a conflict exists between the data entities stored in data source AD and OID 110 corresponding to the user "Peter Pan". The IDU 100 may perform a conflict resolution operation between the conflicting entities and may determine that the user associated with "Peter Pan" on AD is not the same person as the user "Peter Pan" on OID. In performing the conflict resolution, a composite RDN is generated for the user "Peter Pan". The IM 130 may reconcile the redundant forms of identification to the single globally unique identity descriptor.

When manipulating user objects from the data sources to find intersections between the objects, the IDU 100 may generate a superset of global identities and consolidated attributes for a user from any number of disparate identity sources such as DSs 110. The IDU 100 may support a plurality of different join operations, or transformation mappings, including, but not limited to, proxy mapping, hierarchical mapping, aggregation joins, and/or N-ary joins.

For proxy mapping, the users and groups (user containers) stored in the backend data source 110 may be represented as virtual IDU DNs. The IDE 120 may send a search request for the user (e.g., using login attributes) and receive a user IDU DN in response. The IDU 100 may support under proxy mapping: (1) authentication using the received user IDU DN; (2) fetching a user policy associated with a user IDU DN, where the IDU 120 is setup as the policy repository; and (3) fetching modified objects, where the IDU is setup as the policy repository, among others.

A hierarchical transformation may be used to generate IDU group mappings. Using a hierarchical mapping, the users and groups in the backend DSs 110 may be represented as virtual IDU DNs. The IDE 120 may send a search request for the user and may receive an IDU virtual user/group object. The backend user/group DN may be available as an attribute of the user/group object. The members of the group may be available as IDU DNs. The IDE 120 may map the backend user/group DN to an IDU user/group DN to fetch associated policies. The IDU 100 may support under hierarchical transformation: (1) authentication using the received user IDU DN; (2) fetching a user policy by user IDU DN, where IDU is setup as the policy repository; (3) fetching a group policies, where IDU is setup as the policy repository; and (4) fetching modified objects, where IDU is setup as the policy repository, among others.

The aggregation join operation may include a union to process users from different data sources. The users and groups in the backend DSs 110 may be represented as virtual IDU DNs. The IDE 120 may send a search request for the user and may receive an IDU virtual user/group object. The backend user/group DN may be available as an attribute of the user/group object. The members of the group may be available as IDU DNs. The IDU DN for the user includes a single backend user DN. The IDE may map the backend user/group DN to an IDU user/group DN to fetch associated policies. For authentication, the primary node of the join is used to authenticate the user. The IDU 100 may support under such an aggregation join: (1) authentication using the received user IDU DN against the primary node; (2) fetching a user policy by user IDU DN, where IDU is setup as the policy repository; (3) fetching a group policies, where IDU is setup as the policy repository; and (4) fetching modified objects, where IDU is setup as the policy repository, among others.

Figure 5:
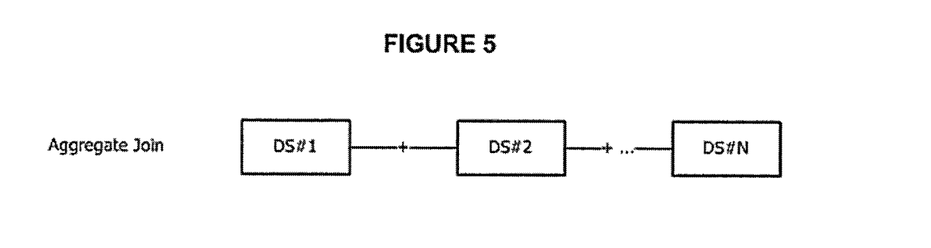
FIG. 5 is a diagram illustrating an aggregate join of user identifiers from multiple disparate directories or data sources (DS) in accordance with yet another exemplary embodiment of the present invention.

FIG. 5 is a diagram illustrating an aggregate join of users from multiple DSs 110 in accordance with yet another exemplary embodiment of the present invention.

Referring to FIG. 5, the aggregate join may include a cumulative mathematical summation of data entities DS#1, DS#2 . . . DS#N. The multiple disparate DSs include N DSs (where N is any number 2, 3 . . . ) to merge identities when no conflict exists (i.e., when no overlap of identities occurs), so the resulting flow is a cumulative mathematical summation of the data entities.

Figure 6:
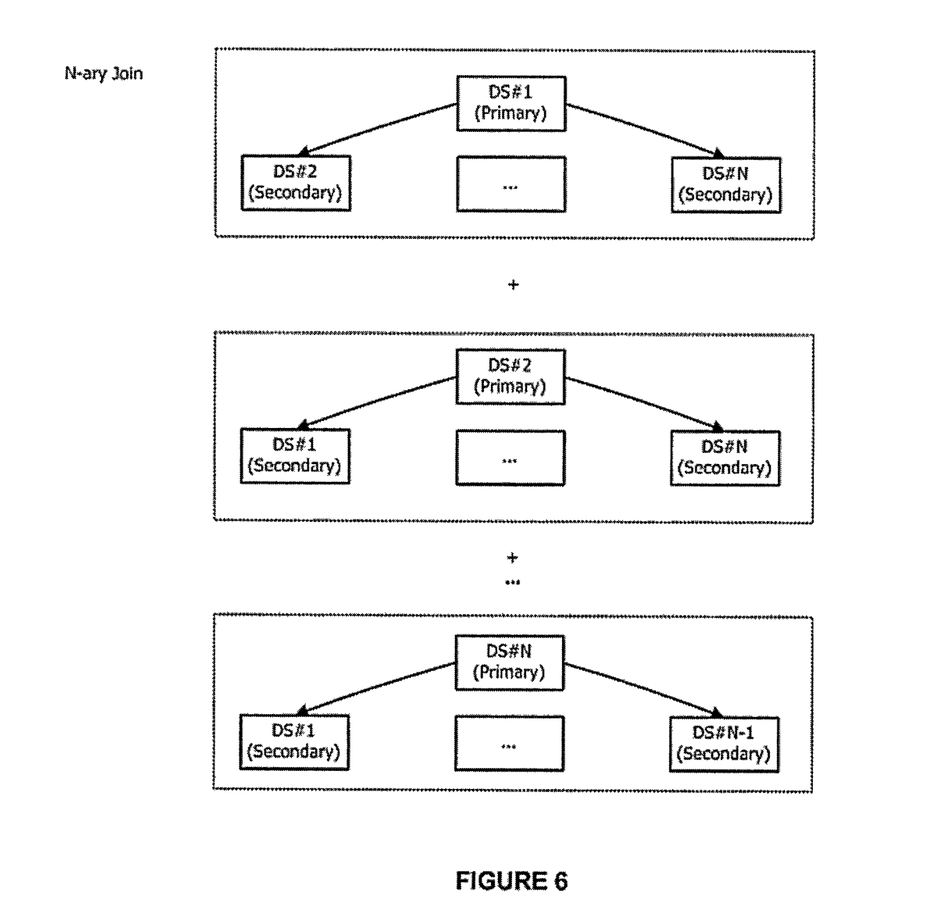
FIG. 6 is a diagram illustrating an N-ary join of user identifiers from multiple disparate directories or data sources in accordance with yet another exemplary embodiment of the present invention.

FIG. 6 is a diagram illustrating an N-ary join of user information in accordance with yet another exemplary embodiment of the present invention.

Referring to FIG. 6, the N-ary join (either transitive or non-transitive) may include a union of multiple DSs 110 based on a common join attribute. The N-ary join may consolidate user information where no superset data store exists and duplicate (or overlapping) data exists. The users and groups in the backend DSs 110 are represented as virtual IDU DNs. The IDE 120 may send a search request for the user (e.g., using login attribute such as a password, user ID or biometrics, among others) and may receive an IDU virtual user/group object. The backend user/group DN may be available as an attribute of the user/group object. The members of the group may be available as IDU DNs. The IDU DN for the user may include multiple backend user DNs. IDE 120 may map the backend user/group DN to an IDU user/group DN to fetch associated policies. For authentication, any of the IDU DNs may be used to authenticate the user. The IDU 100 may support under N-ary join: (1) authentication using any one of the received user IDU DNs; (2) fetching a user policy by user IDU DN, where IDU is setup as the policy repository; (3) fetching group policies, where IDU is setup as the policy repository; and (4) fetching modified objects, where IDU is setup as the policy repository, among others.

By manipulating user objects from data sources to find the intersection between the objects, the IDU 100 may generate a superset of global identities and consolidated attributes for a user from any number of disparate identity sources (e.g., LDAP directories, databases, etc.) using the iterative join operation. The N-ary join may include a transitive join operation or a non-transitive join operation; in consideration that no superset data source exists that contains the users, that a user may be present in multiple data sources and that a unique join attribute may not exist across all data sources.

A join operation generally includes a join attribute between a primary data source and one or more secondary data sources. In a transitive join, values of the join attribute from both the primary and secondary data sources may be used to perform lookups in subsequent secondary data sources. In a non-transitive join, the lookup on the secondary data source may be performed using values for the join attribute from the primary data source only. The N-ary join may be a non-transitive join. That is, a different data source serves as the primary data source during each iteration and a different join attribute may be used to perform lookups in the secondary data sources. This process provides flexibility in performing joins on disparate data sources without exclusions.

Referring to FIG. 6, the multiple disparate DSs 110 may include N DSs (where N is any number 2, 3 . . . ), for example. The join may be a non-transitive join, and the lookup on the secondary data source may be performed using values for the join attribute from the primary data source only. In this N-ary non-transitive join, a different DS 110 may serve as the primary data source during each iteration and a different join attribute may be used to perform lookups in the secondary data sources. The results from each iteration may be summed, so that the result includes a cumulative mathematical summation of data entities. The IDE 120 may use the IDU 100 as an identity virtualization engine to authenticate users and containers (e.g., user container/user groups) in pre-existing data sources without changes or top-down provisioning to facilitate policy enforcement at the IDE 120.

Figure 7:
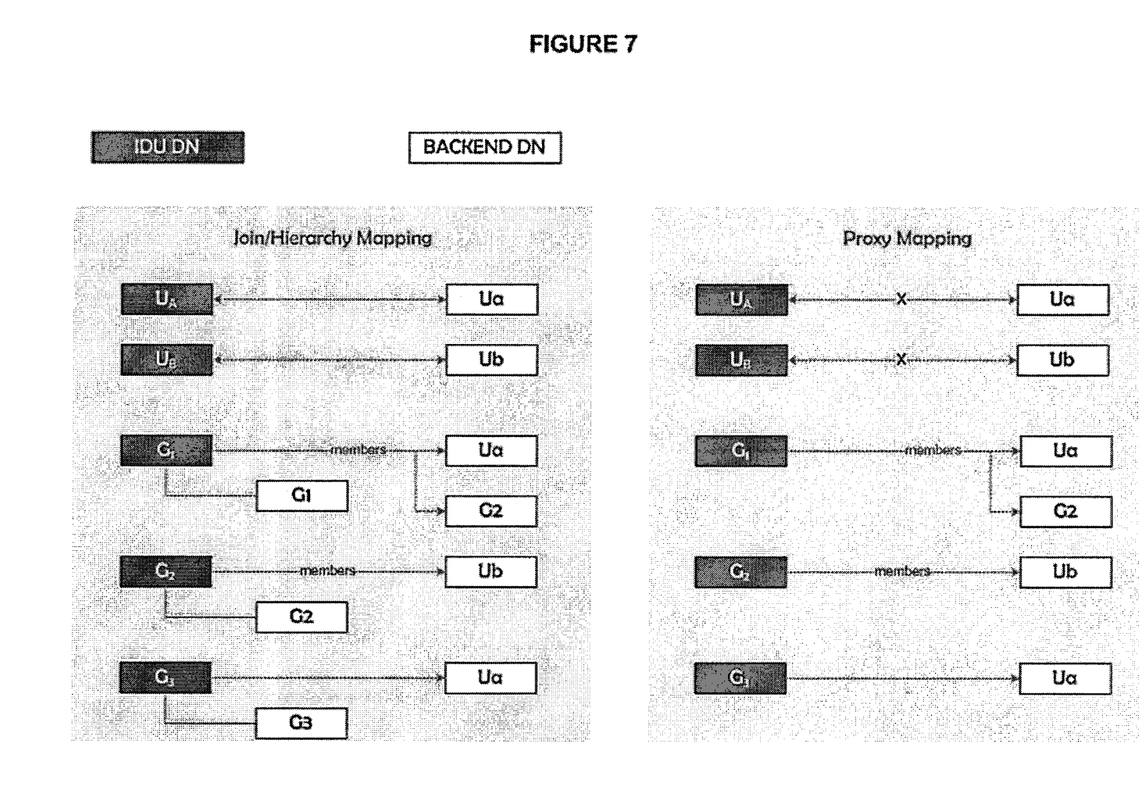
FIG. 7 is a block diagram illustrating an N-ary join of users in multiple disparate directories in accordance with yet another exemplary embodiment of the present invention.

FIG. 7 is a block diagram illustrating an N-ary join of users (e.g., information associated with users) from multiple disparate directories in accordance with yet another exemplary embodiment of the present invention. In this exemplary embodiment, possible overlap of identities exists, and no superset data source exists. The N-ary non-transitive join provides variable join attributes across each join with a different data source as the primary of the join.

Referring back to FIG. 5, the backend DN for user A is represented as "$U_a$", the backend DN for group 1 is represented as "$G_1$", the IDU DN for user A is represented as "$U_A$", and the IDU DN for group 1 is represented as "G1".

The IDE 120 may query the IDU 100 for groups and respective memberships. The IDU may return IDU DNs for the groups (e.g., G1, G2, G3), including as attributes the backend group DN, and user/group members as backend DNs. For nested groups, the IDE may map the backend DNs to the IDU DNs. Such a query may occur, for example, dynamically, on restart or based on user input.

When a user logs in, the IDE 120 may send a search request with user credentials to the IDU 100 and, in response, receives the IDU DNs for the user (e.g., $U_A$, $U_B$). The IDE then may send a bind request to authenticate with the IDU DN. On successful authentication, the IDE 120 may determine group memberships based on the user's IDU DN.

In certain exemplary embodiments, the IDU may serve as the single authoritative source of globally unique user identity validation, policy and user/user-container level directory attribute association based on the validation for network level access control. Furthermore, the IM 130 may display users and groups mapped to the IDU DNs, and user and group policies may be defined for IDU DNs.

For either the aggregate join operation or N-ary join operation, during user authentication, the IDE 120 may send user credentials (e.g., a domain, a username, among others.) to the IDU 100. The IDU 100 may initiate search operations, for example, LDAP search operations on backend directories DSs 110 based on aggregate or N-ary mappings/transformation rules configured on the IDU 100 to fetch one or more backend distinguished names (DNs). The IDU 100 may generate a mapped IDU DN for each backend DN. The IDU may send to the IDE one mapped IDU DN corresponding to each backend DN, using a composite RDN. The composite RDN may be formed using a DN and one or more unique directory attributes (e.g., email-id, employee-id, department-id, SSN, telephone-extension, etc.). If user information (user objects) associated with the user exists in multiple (e.g., N) backend directories, N IDU DNs may be returned to IDE 120. The IDE 120 may perform a bind operation on each IDU DN in the returned list to authenticate the user. The authentication may be considered successful, for example, when one or more of the user's credentials match the user information in one of the IDU DNs in the returned list.

Referring back to FIG. 5, for a user-container (group level membership) during restart and/or dynamic updates, the IDE 120 may request (query) some or all groups from the IDU 100. The IDU 100 may perform search operations on backend directories 110 to fetch the groups and may generate a mapped IDU DN for each backend group using a composite RDN. The mapped IDU Group DN objects returned to the IDE 120 may include, as group object attributes, the backend user DNs and nested mapped IDU group DNs. The IDE may translate the backend user DNs to mapped IDU user DNs.

Figure 8:
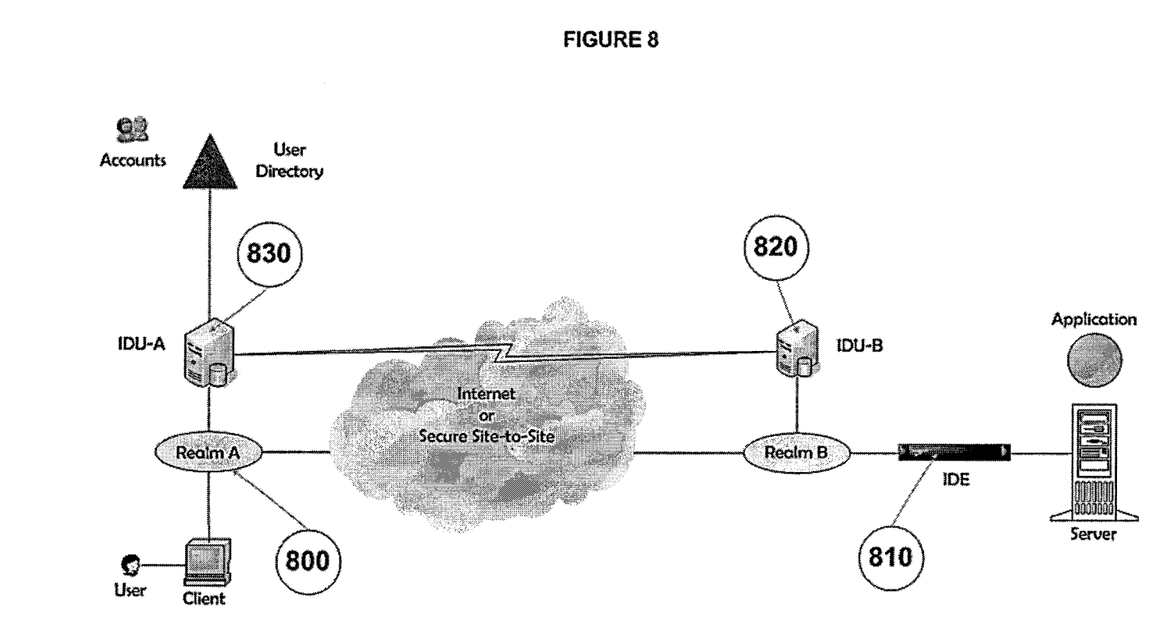
FIG. 8 is a schematic diagram of cross-realm inter-domain data consolidation in accordance with yet another exemplary embodiment of the present invention.

FIG. 8 is a schematic diagram illustrating cross-realm inter-domain data consolidation in accordance with yet another exemplary embodiment of the present invention.

In certain exemplary embodiments, the multiple disparate data sources 110 may reside outside of a single administrative scope or authority. For example, users from one agency, partner organization or subsidiary may have access to resources outside their local realm. Users authenticated in their local realm 800 (e.g., Realm A), for example, having access to extranet resources may present their local realm credentials to a remote IDE 810 (e.g., Realm B). The remote IDE 810 then may request authentication of these credentials from directory IDU-B 820 in Realm B. The IDU-B 820 may securely transport the credentials to the requestor's local IDU-A 830 (in Realm A) for user authentication. That is one IDU 830 may virtualize another trusted IDU 820 to expand the scope of a join operation. Furthermore, one IDU may itself serve as a data source to another IDU 830. In certain exemplary embodiments, an IDE (not shown) associated with the local IDU 830 may permit or restrict access to the resource via the first computing environment based on the global unique identifier from the second computing environment.

Static access control lists without an identity component are not an extensible framework in current mobile networking environment where source IP address are translated by NAT and VPN gateways to obscure a true endpoint address of the remote user at the point of network access. Identity-based access control may use tighter integration with identity data silos and virtualization for administrative simplicity and manageability.

The IDE may provide an innovative approach to enforce application specific access privileges based on directory enrollment of users and user containers at the network layer. The IDE may provide end-users the flexibility to use one of multiple credentials in one or multiple realms to derive globally unique access policies based on granular role and access profiles. Identity virtualization allows the IDE to enforce access control policies keyed by authentication profiles including the user's current login credentials, authentication sources such as authentication server that validated the user in the session, cross-domain/realm validation of user identity across trust bridges, and dynamic role-based access privileges.

The virtual data-less identity join provided by the IDU enables the IDE to accommodate dynamically changing user and user container attributes to adjust access controls without requiring changes with top down provisioning of policies enforced on the IDE.

The IM may provide an interactive and intuitive user interface to identity conflicts and resolve conflicts in tight integration with extensible IDU mapping elements. The IM may include a graphical user interface that enables policy administrators to manage conflict and ambiguity resolution during policy definition to ensure appropriate access privileges are provisioned for resource access.

Certain exemplary embodiments use one or more unique directory attributes to generate the unique global user identifier for policy definition using a composite RDN. For example, a company wide employee ID or email address may be used as the attribute to uniquely differentiate between two users with the same first and last name. This is extensible and may be modified to use a different set of attributes later. The IDU abstracts the intricacies of such conflict resolution from the IDE in the control path of the user session.

Although the system is described with reference to IDUs, IDEs and DSs, the system may include hardware and software i.e., processor-based devices or computing devices operating together, or components thereof. For example, the processing system may include one or more of a portable computer, portable communication device operating in a communication network, and/or a network server. The portable computer may be any of a number and/or combination of devices selected from among personal computers, mobile telephones, personal digital assistants, portable computing devices, and portable communication devices, among others. The processing system may also include components within a larger computer system.

The processing system may include at least one processor and at least one memory device or subsystem. The processing system also may include or be coupled to at least one database. The term "processor" as generally used herein refers to any logic processing unit, such as one or more central processing units (CPUs), digital signal processors (DSPs), application-specific integrated circuits (ASIC), etc. The processor and memory may be monolithically integrated onto a single chip, distributed among a number of chips or components, and/or provided by some combination of algorithms. The methods described herein may be implemented in one or more of software algorithm(s), programs, firmware, hardware, components, circuitry, in any combination.

Components of the systems and methods described herein may be located together or in separate locations. Communication paths couple the components and include any medium for communicating or transferring files among the components. The communication paths may include wireless connections, wired connections, or hybrid wireless/wired connections. The communication paths also may include couplings or connections to networks including local area networks (LANs), metropolitan area networks (MANs), WiMax networks, wide area networks (WANs), proprietary networks, interoffice or backend networks, or the Internet. Furthermore, the communication paths include removable fixed mediums such as floppy disks, hard disk drives, and CD-ROM disks, as well as flash RAM, Universal Serial Bus (USB) connections, RS-232 connections, telephone lines, buses, or electronic mail messages.

Although the invention has been described in terms of system and method for establishing and maintaining globally unique identities and a method thereof, it is contemplated that the method may be executed by a computer using software stored on a computer readable storage medium, for example, a magnetic or optical disk, or a memory-card.

What is claimed is:

1. A method of establishing a global unique identifier for access control, comprising:
   obtaining, by an identity server, a plurality of identifiers each used individually for identity-based access control and correspondingly obtained from a disparate data source, the plurality of identifiers being associated with a user of a network and each individually uniquely identifying the user;
   resolving a conflict between the plurality of identifiers; and
   establishing a global unique identifier for access control by generating a join of the plurality of identifiers, wherein the global unique identifier consolidates disparate forms of identification associated with the user from the plurality of data sources.

2. The method of claim 1 comprising:
   establishing one or more policies associated with the global unique identifier; and
   restricting access to a resource on the network by the user based on the one or more policies associated with the global unique identifier.

3. The method of claim 2, comprising allowing access to the resource when the user is authenticated and the one or more policies permit access by the user to the resource.

4. The method of claim 2, wherein the obtaining of the plurality of identifiers includes:
   determining a plurality of identifier storage locations, each identifier storage location storing one or more of the plurality of identifiers; and
   querying each of the identifier storage locations to obtain the plurality of identifiers.

5. The method of claim 4, wherein the generating of the global unique identifier includes:
   determining whether information associated with the user from the plurality of identifier storage locations conflict; and
   if the user information from the plurality of identifier storage locations do not conflict, generating an aggregate join of the plurality of identifiers.

6. The method of claim 4, comprising:
   selecting one or more attributes of the global unique identifier for identifying the user when a conflict exists between information associated with the user from the plurality of identifier storage locations; and
   determining the one or more policies to be used for access control by matching user information from the user or a client system of the user regarding the one or more attributes to the one or more attributes in the global unique identifier.

7. The method of claim 2, wherein the generating of the global unique identifier includes generating an N-ary join of the plurality of identifiers.

8. The method of claim 1, comprising:
   storing the plurality of identifiers associated with the user in a plurality of identity source devices;
   receiving a request for accessing the resource from the user; and
   identifying the one or more policies to be applied to the request for access by the user by generating the global unique identifier each time from the stored plurality of identifiers for each request for access.

9. The method of claim 2, wherein the plurality of identifiers is associated with the user or a user group identified with the user.

10. The method of claim 1, wherein the join is one of an aggregate join or an N-ary join.

11. The method of claim 10, wherein the join is one of a transitive join or a nontransitive join.

12. The method of claim 1, wherein the join is a non-transitive N-ary join and the generating of the non-transitive N-ary join includes:
   performing a plurality of join iterations on the plurality of data sources, wherein a different data source of the plurality of data sources serves as a primary data source during each join iteration; and
   summing results from each join iteration.

13. The method of claim 1, wherein resolving the conflict between the plurality of identifiers comprises providing one or both of reconciliation or normalization of one or more redundant identities.

14. The method of claim 1, further comprising:
   determining a plurality of attributes corresponding to the user, the plurality of identifiers including the plurality of attributes; and
   combining at least two attributes of the plurality of attributes to form a composite attribute, wherein the composite attribute is a non-conflicting attribute, and the global unique identifier includes the composite attribute.

15. The method of claim 14, wherein the plurality of attributes include at least two of: (1) information unique to the user; (2) a user name; (3) an email identification; (4) an employee identification; (5) a department identification; (6) a social security number; or (7) a telephone extension number.

16. The method of claim 1, wherein resolving the conflict between the plurality of identifiers comprises resolving one or more ambiguous identities.

17. The method of claim 1, wherein resolving the conflict between the plurality of identifiers comprises combining two or more attributes to form a composite attribute corresponding to the user.

18. An identity server configured to communicate with an access server and a plurality of identity storage devices for generating a unique global identifier, the identity server comprising:
  an identity virtualization client configured for querying a plurality of identifiers associated with a user of the network, each of the plurality of identifiers used individually for identity-based access control and correspondingly obtained from a disparate identity storage device, and individually uniquely identifying the user;
  an identity consolidation engine configured for resolving a conflict between the plurality of identifiers and generating a unique global identifier for access control by generating a join of the plurality of identifiers, wherein the unique global identifier consolidates disparate forms of identification associated with the user from the plurality of identity storage devices.

19. The identity server of claim 16, wherein the identity consolidation engine is configured to resolve the conflict between the plurality of identifiers by one or both of reconciliation or normalization of one or more redundant identities.

20. An identity server configured for generating a unique global identifier for accessing secured resources on a network, the identity server comprising:
  an identity virtualization server configured for receiving an access request to access one or more secured resources on the network, the access request including a user identifier indicating a user requesting access to the one or more secured resources;
  an identity virtualization client configured for querying a plurality of devices for a plurality of identifiers associated with the user responsive to reception of the access request, each of the plurality of identifiers used individually for identity-based access control and correspondingly obtained from a disparate device, and individually uniquely identifying the user;
  an identity consolidation engine configured for resolving a conflict between the plurality of identifiers, for generating a unique global identifier for access control by generating a join of the plurality of identifiers, and for identifying one or more access policies associated with the unique global identifier, wherein the unique global identifier consolidates disparate forms of identification associated with the user from the plurality of devices; and
  a policy virtualization engine configured for permitting access to the one or more secured resources when the user is allowed to access the one or more secured resources based on the identified access policies.

21. The identity server of claim 20, wherein the policy virtualization engine is configured to restrict access to the one or more resources when the user is not permitted access to the one or more resources based on the identified access policies.

22. A method of establishing a global unique identifier for access control, comprising:
  receiving a request from a user at a first computing environment for access to a resource located in a second computing environment separate from the first computing environment;
  obtaining, by an identity server in the second computing environment, a plurality of identifiers from a plurality of data sources, the plurality of identifiers being associated with the user and each used individually for identity-based access control and correspondingly obtained from a disparate data source, and individually uniquely identifying the user;
  resolving a conflict between the plurality of identifiers;
  establishing, by the server in the second computing environment, the global unique identifier for access control by generating a join of the plurality of identifiers, wherein the global unique identifier consolidates disparate forms of identification associated with the user from the plurality of data sources; and
  permitting access to the resource via the first computing environment based on the global unique identifier from the second computing environment.

23. A non-transitory computer readable storage medium for storing program code for executing a method of securing access to a resource on a network using a global identifier, comprising:
  obtaining a plurality of identifiers associated with a user of the network, each of the plurality of identifiers used individually for identity-based access control and correspondingly obtained from a disparate data source, and individually uniquely identifying the user;
  resolving a conflict between the plurality of identifiers;
  generating a global identifier for access control by generating a join of the plurality of identifiers, wherein the global identifier consolidates disparate forms of identification associated with the user from the plurality of data sources;
  establishing one or more policies associated with the global identifier of the user; and
  restricting access to the resource on the network by the user based on the one or more policies associated with the global identifier.

* * * * *